Nov. 30, 1954  G. P. DAS  2,695,648
ANTISKID DEVICE
Filed Jan. 6, 1953  2 Sheets-Sheet 1
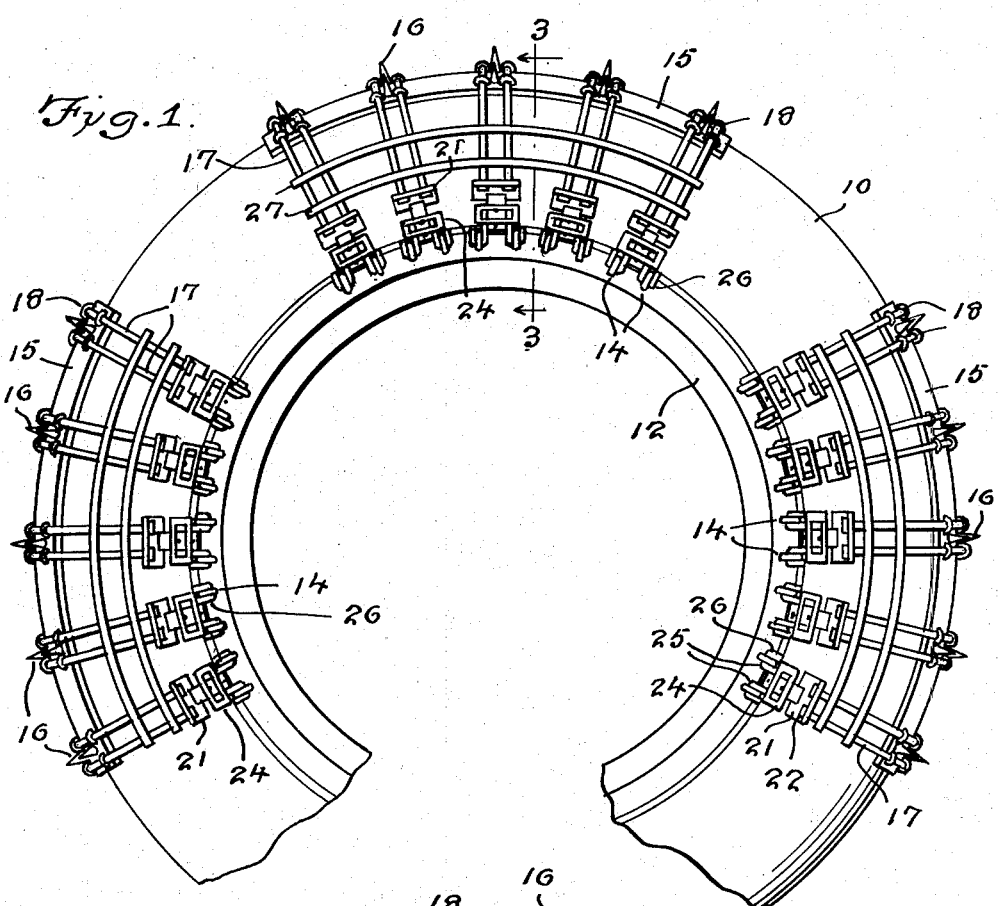
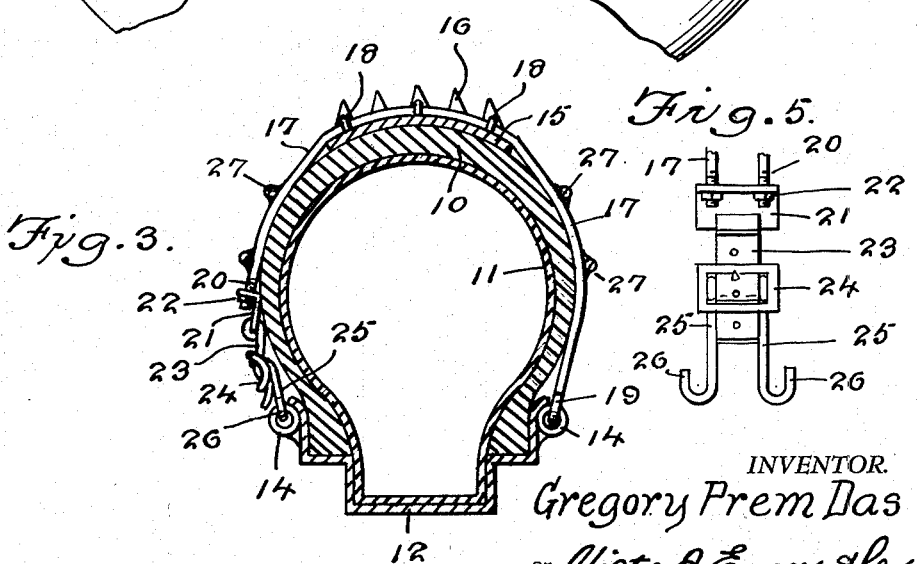
INVENTOR.
Gregory Prem Das
BY Victor J. Evans & Co.
ATTORNEYS Nov. 30, 1954  G. P. DAS  2,695,648
ANTISKID DEVICE Filed Jan. 6, 1953  2 Sheets-Sheet 2

INVENTOR.
Gregory Prem Das
BY Victor J. Evans & Co.
ATTORNEYS

United States Patent Office 2,695,648
Patented Nov. 30, 1954

2,695,648
ANTISKID DEVICE
Gregory Prem Das, Detroit, Mich.

Application January 6, 1953, Serial No. 329,869

3 Claims. (Cl. 152—230)

This invention relates to an anti-skidding device, and more particularly to an anti-skidding device for vehicle wheels.

The object of the invention is to provide an anti-skidding device for use on wheels of trucks, automobiles and the like which is to be fitted on the wheels in case of emergency whereby skidding of the vehicle will be prevented.

Another object of the invention is to provide an anti-skidding device which will fit wheels of different sizes, there being a fastening means for maintaining the device of the present invention securely attached to the wheel, the present invention being dependable, quick acting and easy and quick to install and adjust.

A further object of the invention is to provide an anti-skidding device which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a front elevational view showing the anti-skidding device of the present invention attached to a vehicle wheel.

Figure 3 is a sectional view taken on the line 3—3 of Figure 1.

Figure 5 is a fragmentary elevational view showing the fastening means.

Figure 2:
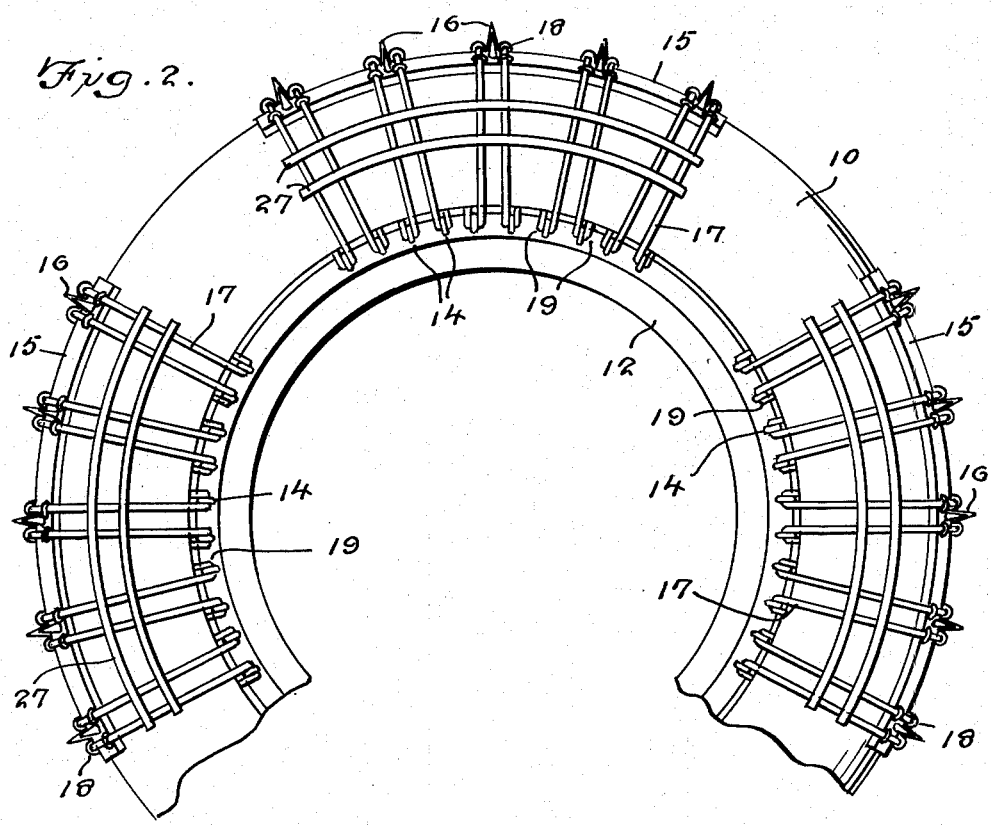
Figure 2 is a rear elevational view showing the present invention in use.
Figure 4:
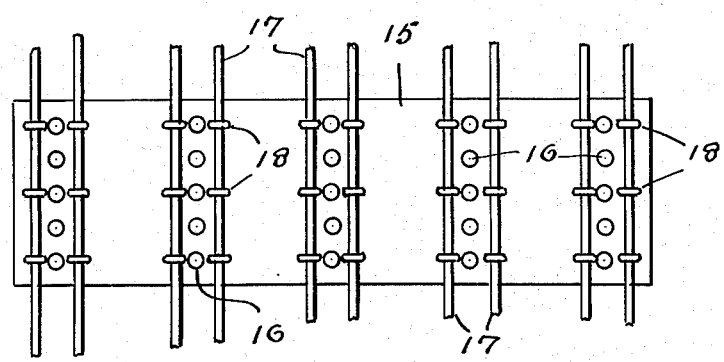
Figure 4 is a top plan view showing one of the plates.

Referring in detail to the drawings, the numeral 10 designates a portion of a conventional vehicle tire and the tire 10 has the usual inner tube 11 mounted therein. The tire 10 is mounted on a conventional rim 12, Figure 3, and secured to the rim 12 adjacent each side thereof is a plurality of spaced parallel rings 14.

Arranged contiguous to the outer periphery of the tire 10 is a plurality of curved plates 15 which may be made of any suitable material such as metal. Extending from each of the plates 15 and secured thereto in any suitable manner is a plurality of pointed prongs or spikes 16.

Extending transversely across the plates 15 and secured thereto by clips or hooks 18 is a plurality of spaced parallel cables or arms 17. One end of each of the arms 17 is provided with a hook 19 for engaging the rings 14 on one side of the rim 12.

The other side of each of the arms 17 is provided with a threaded portion 20, Figure 5, and an L-shaped plate 21 is mounted on the threaded portions 20. Thus, one of the plates 21 is provided for each pair of arms 17. Suitable nuts 22 are arranged in threaded engagement with the portions 20 for maintaining the plates 21 on the threaded portions 20. A belt 23 has one end portion secured to each of the plates 21, and a buckle 24 is mounted on each of the belts 23. Extending from each of the buckles 24 is a pair of rods 25 which each has a hook 26 thereon for engagement with the rings 14 on the opposite side of the rim 12. The belt 23 and buckle 24 can be adjusted whereby the anti-skidding device of the present invention can be secured to tires of various sizes. Extending transversely between the arms 17 and secured thereto in any suitable manner, as for example by welding, is a plurality of spaced cables or bars 27.

In use, the plates 15 are arranged contiguous to the outer periphery of the tire 10, and the hooks 19 are arranged in engagement with the rings 14 on one side of the rim 12. Then, the hooks 26 are arranged in engagement with the rings 14 on the other side of the rim 12, and then the belts 23 and buckles 24 are tightened so as to maintain the anti-skid devices of the present invention securely fastened to the wheel.

The plurality of spikes 16 will prevent the vehicle from slipping on icy or muddy or wet roadways and the clips 18 will prevent the cables or arms 17 from sliding back and forth on the plates 15. The cables or bars 27 act to strengthen and support the arms 17 and also serve to counteract the whipping and centrifugal forces set up while the vehicle is in motion. The rings 14 on the rim 12 permit the plates to be mounted on the tire without the necessity of jacking up the car. The device of the present invention has an extremely large contact surface with the ice covered highways and the like and any number of the plates 15 can be used on a tire as desired. Also, the present invention is simple, positive, quick acting and easy and quick to adjust since it only requires the fastening of the belt buckle. The bars 27 will not only strengthen the device but will also help to reduce torsional vibration. The spikes 16 will firmly grip the ice or mud to prevent the vehicle from skidding and thereby make the vehicle more safe to drive or ride in, so that there will be less loss of life from accidents and less property damage.

I claim:

1. An anti-skid device comprising in combination a vehicle wheel including a rim, and a tire mounted on said rim, a plurality of spaced curved plates arranged contiguous to the outer periphery of said tire, a plurality of spikes extending outwardly from each of said plates, a plurality of rings secured to both sides of said rim, a plurality of spaced parallel arms extending transversely with respect to said plates and secured thereto, said arms having hooks on one end for engagement with the rings on one side of the rim, belt and buckle means connected to the other ends of said arms, and hooks connected to said belt and buckle means for engaging the rings on the other side of said rim.

2. An anti-skid device comprising in combination a vehicle wheel including a rim, and a tire mounted on said rim, a plurality of spaced curved plates arranged contiguous to the outer periphery of said tire, a plurality of spikes extending outwardly from each of said plates, a plurality of rings secured to both sides of said rim, a plurality of spaced parallel arms extending transversely with respect to said plates and secured thereto, said arms having hooks on one end for engagement with the rings on one side of the rim, belt and buckle means connected to the other ends of said arms, and hooks connected to said belt and buckle means for engaging the rings on the other side of said rim, and a plurality of spaced curved bars extending between said arms and secured thereto.

3. An anti-skid device comprising in combination a vehicle wheel including a rim, and a tire mounted on said rim, a plurality of plates arranged contiguous to the outer periphery of said tire, a plurality of spikes extending outwardly from each of said plates, a plurality of rings secured to both sides of said rim, a plurality of arms extending transversely with respect to said plates and secured thereto, said arms having hooks for engagement with the rings on one side of the rim, belt and buckle means connected to the other ends of said arms, and hooks connected to said belt and buckle means for engaging the rings on the other side of said rim.

References Cited in the file of this patent

UNITED STATES PATENTS

| Number | Name | Date |
|---|---|---|
| 1,719,746 | Baker | July 2, 1929 |
| 2,091,171 | Watson | Aug. 24, 1937 |
| 2,647,551 | Richards | Aug. 4, 1953 |